United States Patent [19]

Kenmoku et al.

[11] Patent Number: 5,582,741

[45] Date of Patent: Dec. 10, 1996

[54] METHOD FOR TREATING POLLUTED WATER

[75] Inventors: Yoshihiro Kenmoku; Seiji Takayama, both of Tokyo, Japan

[73] Assignee: NEC Environment Engineering Ltd., Tokyo, Japan

[21] Appl. No.: 300,223

[22] Filed: Sep. 6, 1994

[30] Foreign Application Priority Data

Mar. 8, 1994 [JP] Japan ................................... 6-037202

[51] Int. Cl.$^6$ .................................................... C02F 1/32
[52] U.S. Cl. ............................ 210/748; 210/759; 210/760; 210/764; 210/908
[58] Field of Search ................................... 210/748, 759, 210/764, 908, 909, 760, 743, 757

[56] References Cited

U.S. PATENT DOCUMENTS 4,849,114  7/1989  Zeff et al. ............................ 210/748
5,234,606  8/1993  Kazama et al. ...................... 210/748
5,393,394  2/1995  Ikeda et al. .......................... 210/748
5,439,599  8/1995  Gehin et al. ......................... 210/748

*Primary Examiner*—Thomas G. Wyse
*Attorney, Agent, or Firm*—Kanesaka & Takeuchi

[57] ABSTRACT

An oxidizing agent is added to water polluted with organic compounds, especially organic chlorine compounds, disinfection is carried out, and suspended solids in the water are removed. Thereafter, ultraviolet rays are irradiated to oxidize and decompose the organic compounds, and furthermore, volatile organic compounds are separated and removed from the water. Finally, the oxidizing agents residual in the water are reduced. The oxidizing agent is separately added at two phases of disinfection and oxidization decomposition, thereby causing the decomposing efficiency of organic compounds to be much improved.

6 Claims, 10 Drawing Sheets

METHOD FOR TREATING POLLUTED WATER

BACKGROUND OF THE INVENTION

The present invention relates to a method for treating water polluted with organic compounds such as organic chlorine compounds.

DESCRIPTION OF THE PRIOR ART

Recently, rivers, lakes, ponds and groundwater have been contaminated with harmful substances. In a case where the river, lake, pond or groundwater are intended to be used for drinking water and/or industrial water, they will not be usable as they are. Public attention has been given to this great social problem.

It has been said that almost all the causes of the contamination of rivers and groundwater are industrial and living waste water having flowed thereinto. It has been pointed out that the treatment and control of organic compounds, such as organic chlorine compounds, etc, for example, trichloroethylene, etc. flowed out from various kinds of factories and dry cleaning plants in the past were insufficient.

Conventionally, as treating technologies of trichloroethylene, etc. in waste solutions, an activated carbon adsorption method, another adsorption method such as high molecular adsorption, reduction by metal iron are already known. The activated carbon adsorption method has been widely utilized at present.

However, there are many cases where dissoluble iron, manganese, silica, suspended solids, organic substances, such as humic acid, are contained in water containing trichloroethylene or organic compounds, such as agricultural chemicals. There is a problem that activated carbon is saturated with the above substances, thereby causing effective treatment of the organic chlorine compounds to be spoiled.

To solve this problem, an ultraviolet rays degradation treatment method was developed, wherein oxidative decomposition of organic chlorine compounds is made by irradiating ultraviolet rays in consideration with oxidizing agents, such as ozone (Refer to U.S. Pat. No. 5,234,606).

However, with this method, although it is possible to decompose organic chlorine compounds, such as trichloroethylene, tetrachloroethylene, 1,1,1-trichloroethane, chloroform, etc, there is a great difference in the quantity of ultraviolet irradiation required to decompose different types of substances treated. According to the experiments, for example, the quantity of ultraviolet irradiation necessary to decrease the initial concentration of 0.5 mg/l of 1,1,1-trichloroethane to 0.001 mg/l is 100 or more in case the quantity thereof for trichloroethylene is 1. In a case where the organic chlorine compounds require a large quantity of ultraviolet irradiation to decompose, an ultraviolet rays destruction treatment method as disclosed in the specifications of U.S. Pat. No. 5,234,606, will need a large-scale system.

On the other hand, for example, in a case where the quantity of hydrogen peroxide to be added is little, the reaction for decomposition is slow, and in a case where the concentration of organic substances other than organic chlorine compounds is high, the organic substances consume hydrogen peroxide earlier than the organic chlorine compounds do. Therefore, it is hard to decompose the organic chlorine compounds. In a case where hydrogen peroxide is excessively supplied, the ultraviolet rays will be absorbed in hydrogen peroxide, and added hydrogen peroxide will not be sufficiently decomposed. As a result, organic chlorine compounds are not decomposed. Furthermore, in a case where a gas, such as ozone, is utilized as an oxidizing agent, the decomposition by ultrasonic rays with ozone will hardly proceed if only ozone is added, at the beginning of the treatment, to the water to be treated.

OBJECTS AND SUMMARY OF THE INVENTION

It is an object of the invention to provide a method for completely treating organic compounds, such as organic chlorine compounds, in water to be treated (hereinafter merely called "polluted water"), by treating the polluted water with ultraviolet rays after an oxidizing agent is separately added to the polluted water both in the disinfection process of the polluted water and right before the decomposition process of organic compounds in the water polluted and contaminated with trichloroethylene, 1,1,1-trichloroethane etc.

It is another object of the invention to provide a method for treating organic chlorine compounds remaining in the polluted water after decomposition treatment together with adsorption treatment utilizing gas-water contact and/or activated carbon.

It is a further object of the invention to provide a method which increases the treatment efficiency by suppressing the generation of bacteria in tanks and piping by the addition of oxidizing agents to the polluted water, removing minute suspended solids in the polluted water through filtration, and reducing the oxidizing agents which may slightly remain even after the ultraviolet rays decomposition, and which can adjust and/or control the changes of pH in water due to chlorine ions generated by the decomposition of organic chlorine compounds, etc.

It is a still further object of the invention to provide a system comprising at least a disinfection unit, a decomposition unit and an oxidizing agent adding unit, which completely decompose organic compounds such as organic chlorine compounds in polluted water with ultraviolet rays after an oxidizing agent is added to the polluted water through the oxidizing agent adding unit at the time of disinfection of the polluted water by the disinfection unit and right before the decomposition of organic compounds in the decomposition unit.

The method according to the invention will be described in compliance with the processes thereof, which are divided into the first to fifth processes. The first to fifth processes merely show a primary sequence. Therefore, supplementary processes or treatment may be provided between the processes and/or the sequential order of some processes may be changed.

The first process of the invention is a disinfection process where bacteria or the like contained in the polluted water, such as contaminated groundwater, is disinfected. Therefore, no bacteria is generated in the pipings, filters, various valves, flow meters, level meters, etc., which are located downstream of the disinfection process.

The disinfection is carried out by adding oxidizing agents to the polluted water. Hydrogen peroxide, sodium hypochlorite, hydrochloric acid, etc. or ozone is used as an oxidizing agent to be added to the polluted water. It is preferable that sodium hypochlorite and hydrochloric acid are not used because there is a possibility to generate a secondary pollution since they have chloric ions. Ozone is a gas and is less dissolved into water.

However, as it is easy to make gas-liquid contact by using a static mixer, ozone is effective. But hydrogen peroxide is most preferable because it is very easy to handle.

The second process is for removing the suspended solids in the polluted water. Namely, suspended solids in the polluted water are removed by using a filter or a coagulation sedimentation.

An adequate amount of oxidizing agent is supplied in the first disinfection process and right before the decomposition treatment of the third process. For example, hydrogen peroxide is used for disinfection in the disinfection process, and the residual oxidizing agent carried over in the polluted water is also used in the decomposition process of the third process. As a matter of course, in the third process, it is possible to decompose organic matters by adding the oxidizing agent to the polluted water right before the decomposition in the third decomposition process.

The third process is a decomposition treatment process for organic compounds, where organic compounds, such as organic chlorine compounds, are decomposed by irradiating with ultraviolet rays to the polluted water containing the residual oxidizing agent, which has passed through the second process, and a new oxidizing agent which is added right before the third process.

In the third decomposition process, if the amount of oxidizing agent, such as hydrogen peroxide, ozone, etc. is to little or too much, it is hard to prosecute the decomposition. This is because hydrogen peroxide, ozone, etc. absorb ultraviolet rays. Hydrogen peroxide, ozone, etc absorb ultraviolet rays and then generate active hydroxy radicals (·OH), which contribute to the decomposition of the organic matter. However, if there is an excessive amount of oxidizing agent, the ultraviolet rays are absorbed by the oxidizing agent to cause the oxidizing agent located in the vicinity of ultraviolet rays to be decomposed.

Therefore, the entire amount of oxidizing agent in the water is not effectively decomposed. The amount of hydrogen peroxide before the third process is lessened and hydrogen peroxide is newly added in the third process, thereby causing reliable decomposing conditions to be established.

As ultraviolet rays are irradiated to the polluted water containing the oxidizing agent, active hydroxy radicals are generated in the polluted water, and the radicals decompose the organic compounds, etc.

Furthermore, a cylinder type or vessel type may be permitted to be used for the ultraviolet rays decomposing unit. However, the cylinder type is more preferable and advantageous from the standpoints of installation space, maintainability and effective irradiation of ultraviolet rays. Still furthermore, either one of a high pressure mercury lamp, medium pressure mercury lamp or low pressure mercury lamp may be used as the ultraviolet rays lamp. However, in a case where hydrogen peroxide or ozone is used as an oxidizing agent, it is preferable that a low pressure mercury lamp or a medium pressure mercury lamp, which has a great deal of energy at the wave length of 253.7 nm be used to efficiently decompose hydrogen peroxide or ozone.

The fourth process is a gas-liquid contact and adsorption process, where air is blown into the polluted water for aeration in order to cause the gas-liquid contact between the volatile non-decomposed substances carried over in the polluted water and air to be carried out. Accordingly, volatile organic matters such as organic chlorine compounds, etc., in the polluted water are transferred from liquid phase to gaseous phase. Thereafter, they are adsorbed with activated carbon.

The fifth process is a residual oxidizing agent removing process, where the oxidizing agents carried over in the polluted water are treated and removed using a reducing agent, activated carbon, catalyst resin, etc. In a case where the organic compounds contained in the polluted water are substances that may be comparatively easily decomposed, such as trichloroethylene, tetrachloroethylene, dichloroethylene, etc., the substances can be removed from the water utilizing only the residual oxidizing agent removing process. Therefore, it is possible to omit the gas-liquid contact and adsorption treatment process.

As described above, for the purpose of explanation, the gas-liquid contact and adsorption treatment is regarded as the fourth process, and the residual oxidizing agent removing process is regarded as the fifth process. However, it does not constitute any problem that either one of the gas-liquid contact and adsorption treatment or residual oxidizing agent removing treatment comes first.

In the third process, as organic compounds such as organic chlorine compounds, etc., are decomposed by oxidation, chlorine may be generated, and especially in a case where the concentration of the organic chlorine compounds is high, pH thereof will be remarkably lowered. In this case, alkali agents are added in the third process to adjust pH thereof in order to carry out oxidization decomposition, or alkali agents are added between the decomposition treatment and the residual oxidizing agents removing treatment to adjust pH thereof. Any one of potassium hydroxide, sodium hydroxide, calcium hydroxide, sodium carbonate, etc may be used as an alkali agent. However, the alkali agent that is most preferably used for the treatment is sodium hydroxide.

In the treatment method according to the invention, it is easier and more efficient to treat organic compounds than with the conventional method even in cases where two or more kinds of organic compounds, such as organic chlorine compounds, exist in the polluted water and where organic compounds, such as organic chlorine compounds, which need a larger quantity of ultraviolet irradiation to decompose the constituents are included. Also, by adding the oxidizing agents to the polluted water in a more favorable state, the decomposition efficiency will be able to be increased. Therefore, the treatment method according to the invention, is applied to water polluted with organic compounds, such as groundwater, rivers, waste water discharged from factories and cleaning plants.

DETAILED DESCRIPTION OF THE PREFERRED EMBODIMENTS

Figure 1:
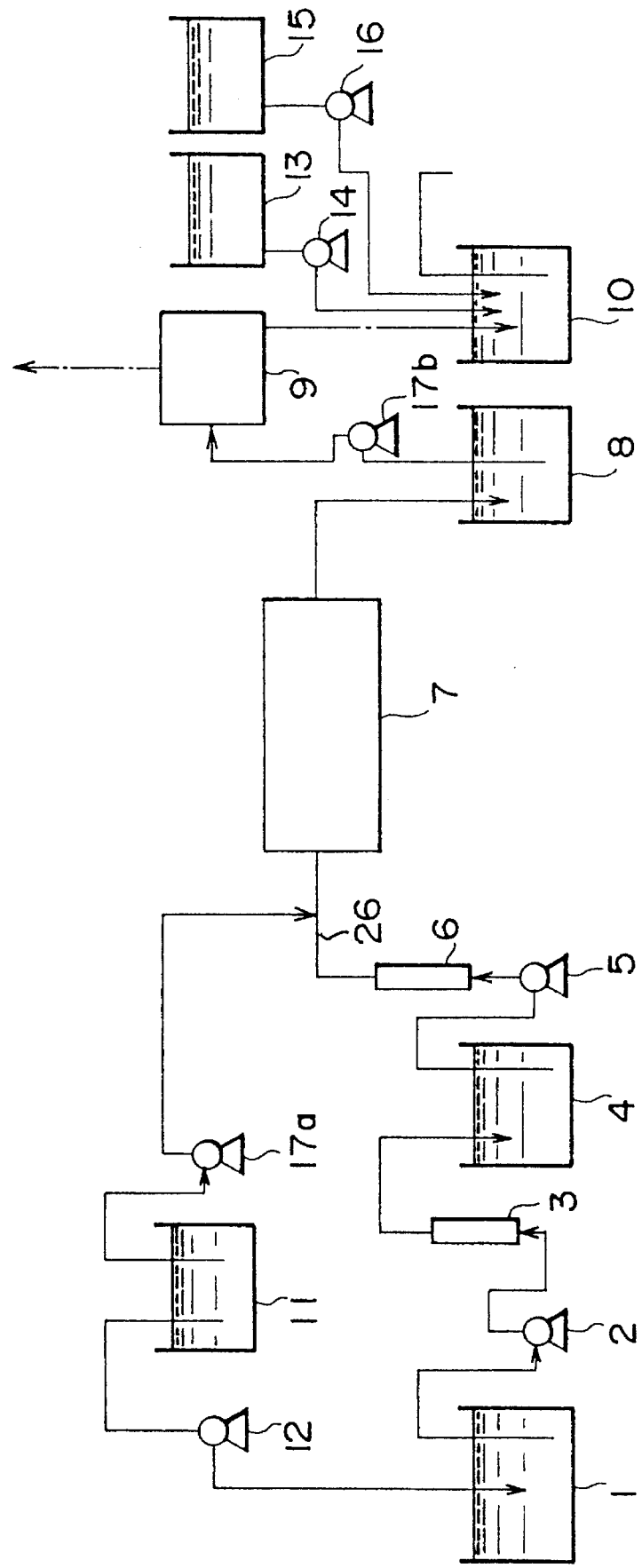
FIG. 1 is a view showing a preferred embodiment of the invention.

With reference to the drawings attached herewith, the preferred embodiments of the invention will be described. The preferred embodiments show the treatment examples of waste water containing trichloroethylene and 1,1,1-trichloroethane. When treating, a unit shown in FIG. 1 is used. The specification of the unit is shown in Table 1 below:

TABLE 1

| First process | Disinfection treatment and oxidizing agents addition | 30% hydrogen peroxide, pump |
|---|---|---|
| Second process | Suspended solids removing treatment | 10-micron cartridge filter |
| | Oxidizing agents added | 30%, $H_2O_2$, Pump used. |
| Third process | Decomposition treatment | Unit capacity: 3.2 liters Unit material: Stainless steel Jacket material: Quartz Lamp type: Low pressure mercury lamp, OGL30W-2 Lamp capacity: 30 watts bulb × three lamps |
| | pH adjustment | 2% Sodium hydroxide |
| Fourth process | Gas-liquid contact and adsorption treatment | Aeration type gas-liquid contact unit Activated carbon (fibrous) |
| Fifth process | Residual oxidizing agents removing treatment | 10% sodium bisulfide |

The residual oxidizing agents removing treatment may be carried out in the fourth process, and the gas-liquid contact and adsorption treatment may be performed in the fifth process.

In FIG. 1, a guaranteed reagent of trichloroethylene and a guaranteed reagent of 1,1,1-trichloroethane were dissolved in a graduated flask in advance, poured into a tank 1 and diluted with pure water to make 40 l. At this time, the trichloroethylene concentration ranges from 0.05 to 8 mg/l, and the 1,1,1-trichloroethane concentration ranges from 0.05 to 8 mg/l. The number of live bacteria was 180 per milliliter. This was used as Test Water. Hereinafter, this Test Water was named Test Water 1. Separately from the Test Water 1, trichloroethylene and 1,1,1-trichloroethane were separately diluted with water to make Test Water, of which the concentration is in a range from 0.05 to 8 mg/l, respectively. The Test Water having only trichloroethylene is named Test Water 2, and the Test Water having only 1,1,1-trichloroethane was named Test Water 3.

With each of the Test Water used as water to be treated, the following experiments were carried out. The details of the experiments are as follows; firstly, the Test Water was transferred from the tank 1 by a pump 2, filtrated by a cartridge filter 3 and stored in a tank 4. Hydrogen peroxide was used as an oxidizing agent. The hydrogen peroxide was supplied from a hydrogen peroxide tank 11 into the tank 1 by a pump 12 and was sent into a pipe 26 between a flow meter 6 and a decomposition tank 7 by a pump 17a. The hydrogen peroxide concentration in the tank 4 was set to about 50 mg/l. The Test Water 1 with hydrogen peroxide reserved in the tank 4 was sent into the decomposition tank 7 through the flow meter 6 by a pump 5, wherein the trichloroethylene and 1,1,1-trichloroethane are decomposed.

Figure 2:
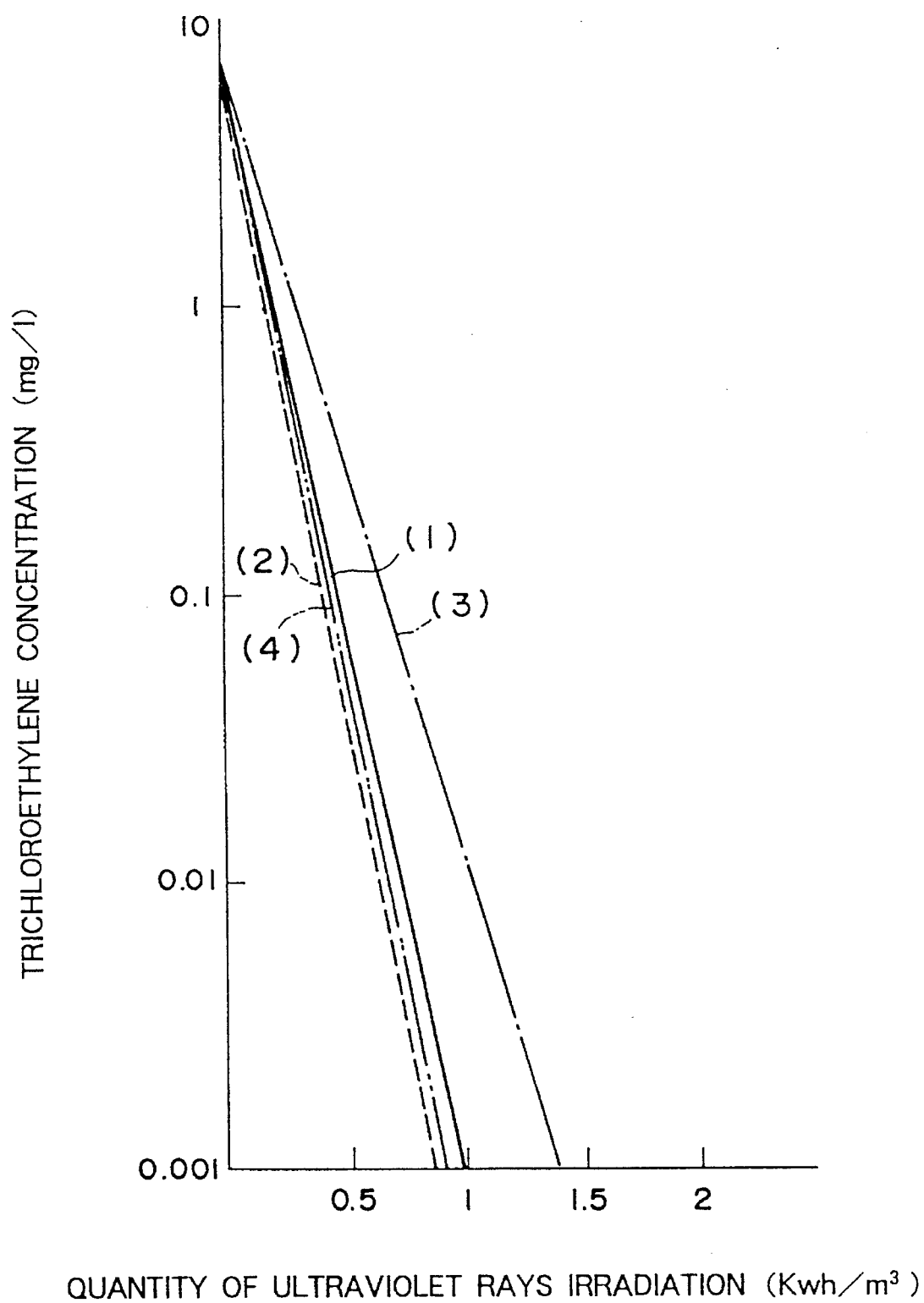
FIG. 2 is a graph showing the comparison of the decomposition effects of trichloroethylene when an oxidizing agent is added to the Test Water through one point and when the oxidizing agent is added to the Test Water through two points, both using the Test Water 1 and Test Water 2.

FIG. 2 shows the results of the decomposition test conducted on the Test Water containing the trichloroethylene, which refer to the results in the respective cases, one of which is a case where hydrogen peroxide having the concentration of 50 mg/l was added only into the tank 1 (disinfection unit), and the other of which is a case where the same hydrogen peroxide was added to the tank 1 and right before the decomposition tank 7. The Test Water 2 in which only the trichloroethylene of the initial concentration of 8 mg/l is contained and the Test Water 1 in which trichloroethylene and 1,1,1-trichloroethane both having the initial concentration of 8 mg/l are simultaneously contained were respectively put in the tank 1 as water to be treated. (1) and (2) in FIG. 2 show the results of the Test Water 2 having only trichloroethylene in the water to be treated. (1) shows the results of a case where hydrogen peroxide was added to only the tank 1, and (2) shows the results of a case where hydrogen peroxide was added to the tank 1 and right before the decomposition unit 7. (3) and (4) show the results of the Test Water 1 which simultaneously contains trichloroethylene and 1,1,1-trichloroethane. (3) shows the results of a case where hydrogen peroxide was added to only the tank 1, and (4) shows the results of a case where hydrogen peroxide was added to the tank 1 and right before the decomposition unit 7.

As made clear from the comparison between the results of (1) and (2) and those of (3) and (4), it is easily understandable that separately adding hydrogen peroxide is more effective than a single adding thereof.

It is understandable from the comparison between (1) and (3) that, in a case where the trichloroethylene and 1,1,1-trichloroethane are contained at the same time, as the decomposing efficiency is remarkably poor only with the adding of hydrogen peroxide into the tank 1, compared with the case where trichloroethylene is contained alone, almost the same results as the case where trichloroethylene is contained alone can be obtained by adding hydrogen peroxide right before the decomposing unit 7.

Judging from the results of (1) and (3), it occurred that easily decomposed substance (trichloroethylene) is suppressed if other substance (1,1,1-trichloroethane) is contained.

Figure 3:
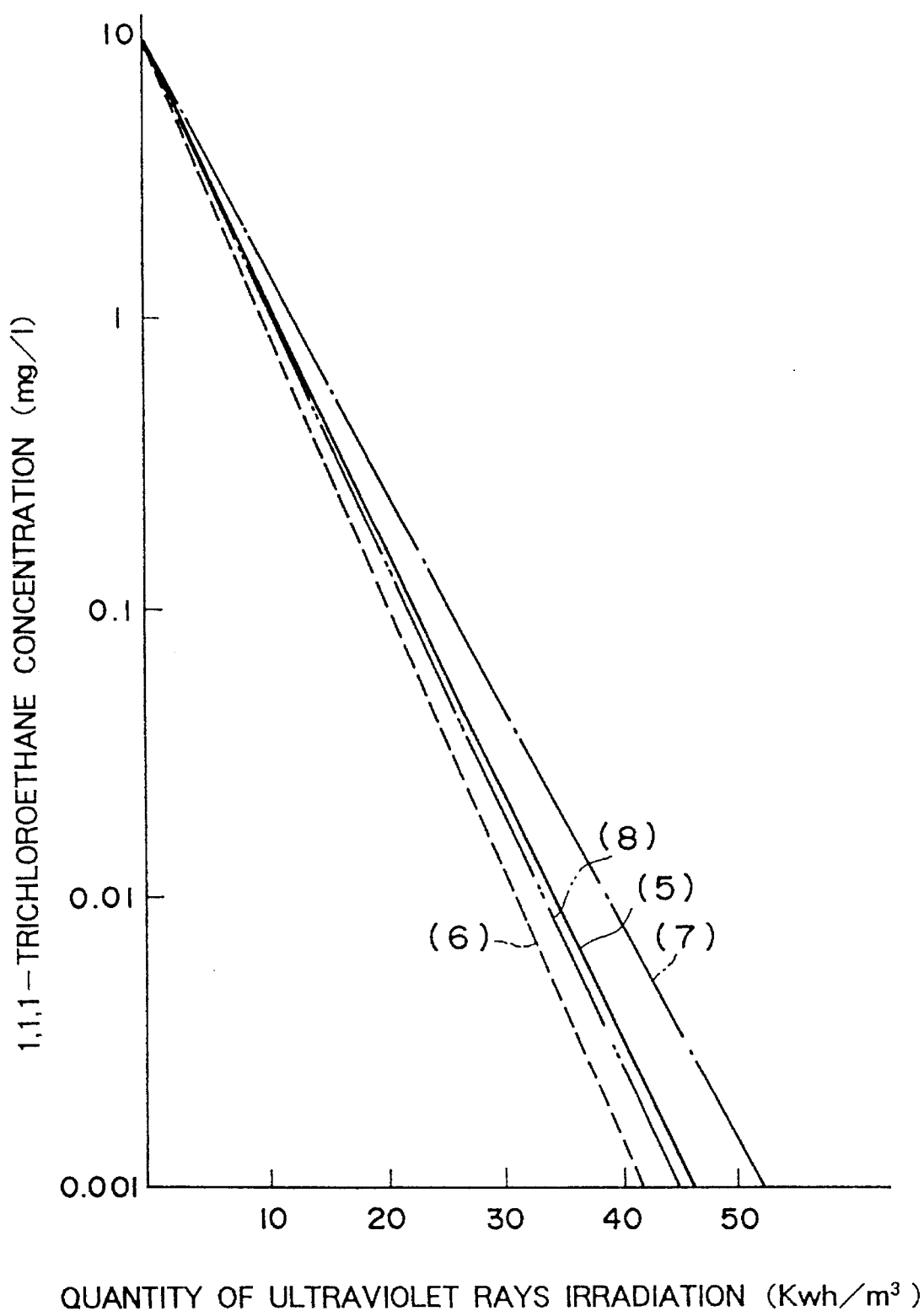
FIG. 3 is a graph showing the comparison of the decomposition effects of 1,1,1-trichloroethane when an oxidizing agent is added to the Test Water through one point and when the oxidizing agent is added to the Test Water through two points, both using the Test Water 1 and Test Water 3.

FIG. 3 shows the measurement results of the decomposition test conducted on the Test Water 3 containing 1,1,1-trichloroethane, wherein (5) shows a case where hydrogen peroxide was added to only the tank 1, and (6) shows a case where hydrogen peroxide was added to the tank 1 and right before the decomposition unit 7.

(7) and (8) show the measurement results for the Test Water 1, wherein (7) shows a case where hydrogen peroxide was added to only the tank 1, and (8) shows a case where hydrogen peroxide was added to the tank 1 and right before the decomposition unit 7.

As made clear from (5) and (6) or (7) and (8), it is considerably advantageous to decompose organic matters if hydrogen peroxide is separately added.

From the comparison between (5) and (7), it is understandable that, in a case where the trichloroethylene and 1,1,1-trichloroethane are contained at the same time, the decomposing ratio is remarkably poor only with the adding of hydrogen peroxide into the tank 1, compared with the case where 1,1,1-trichloroethane alone was contained. However, by further adding hydrogen peroxide right before the decomposing unit 7, it is made clear that the decomposing ratio was improved to a considerable extent. For the Test Water 1, 2 and 3, similar experiments were carried out in a case where hydrogen peroxide adding amount is 300 mg/l which is a little excessive.

Figure 4:
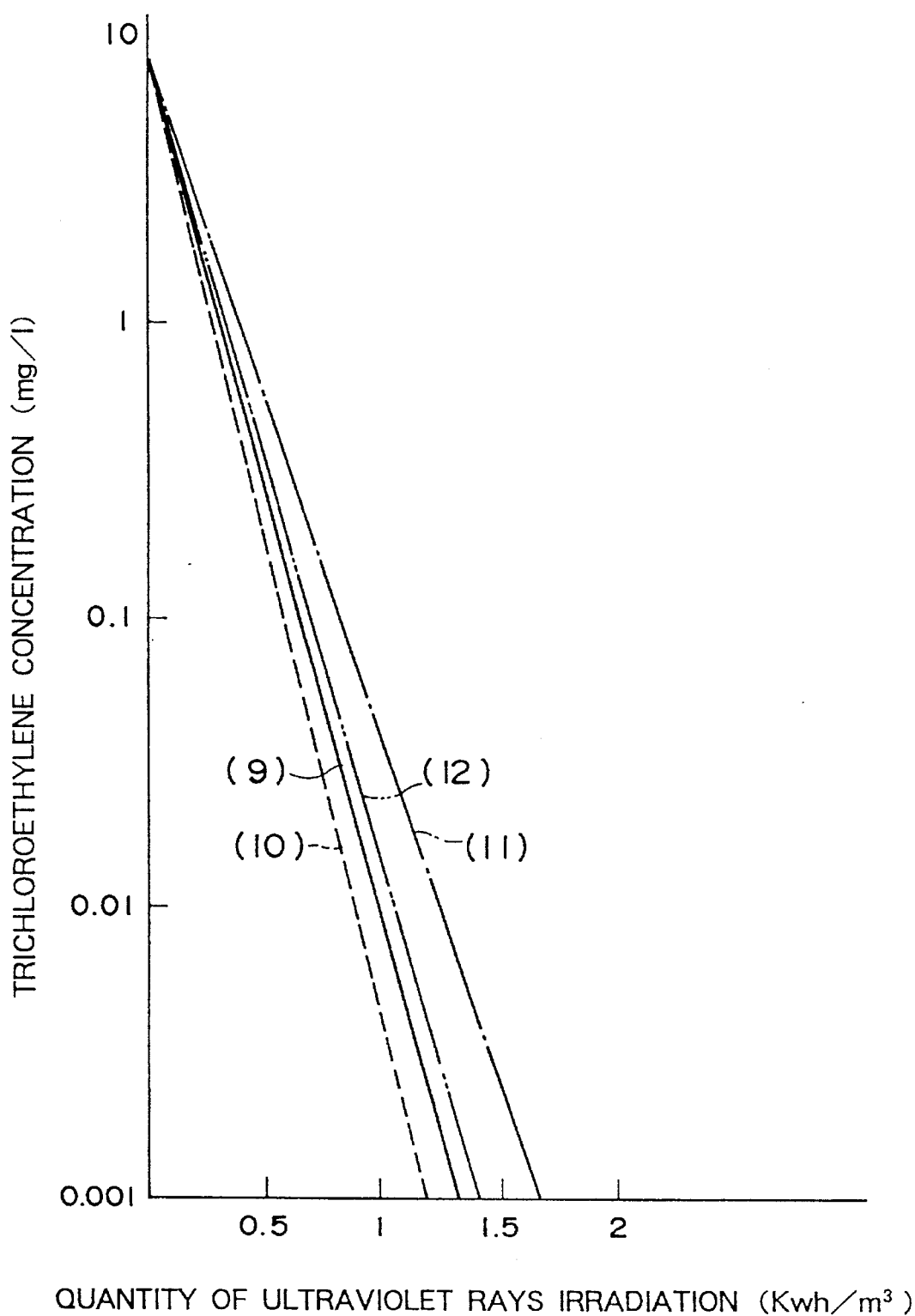
FIG. 4 is a graph showing the comparison of the decomposition effects of trichloroethylene when an oxidizing agent is added to the Test Water through one point and when the oxidizing agent is added to the Test Water through two points, both using the Test Water 1 and Test Water 2.
Figure 5:
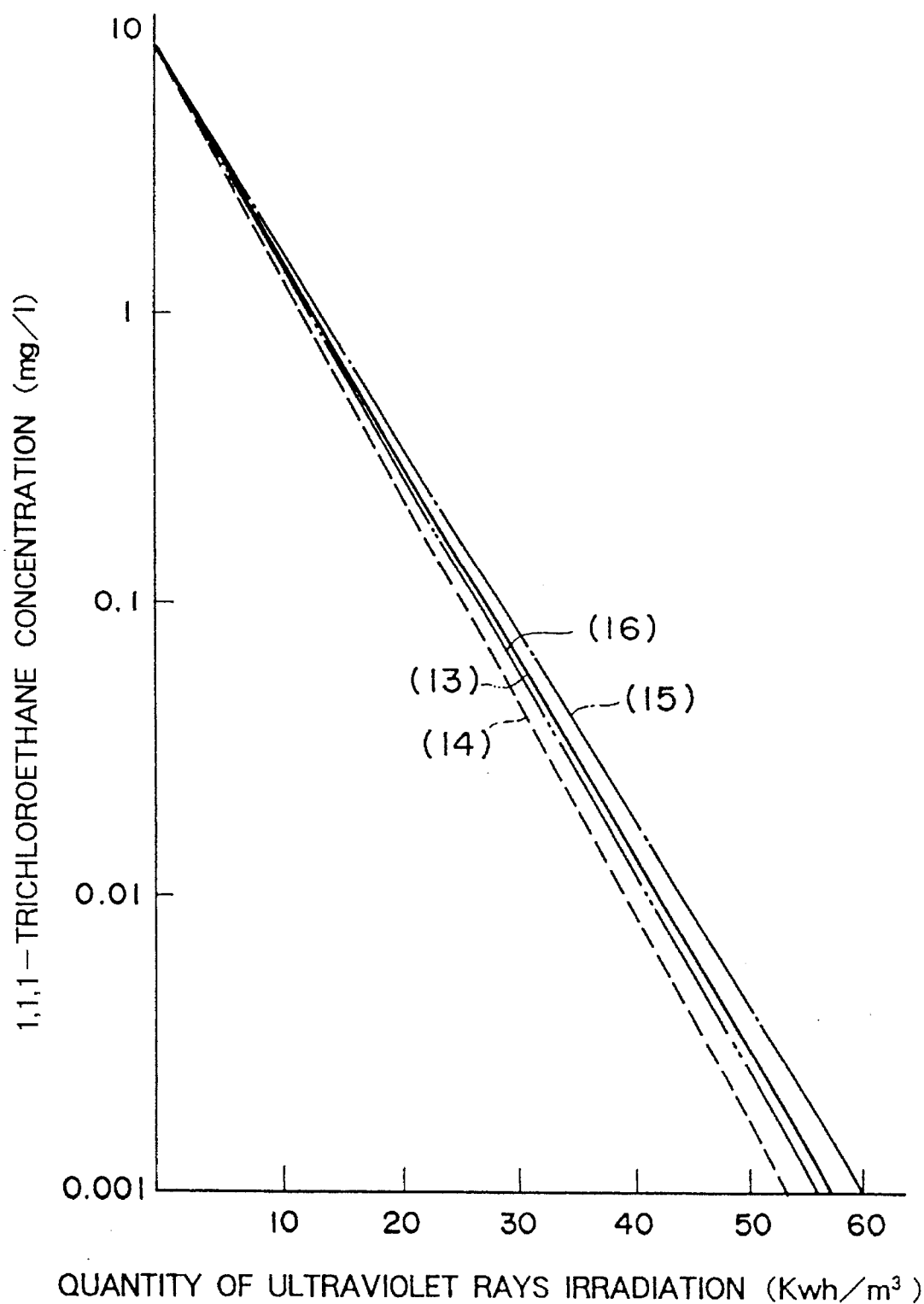
FIG. 5 is a graph showing the comparison of the decomposition effects of 1,1,1-trichloroethane when an oxidizing agent is added to the Test Water through one point and when the oxidizing agent is added to the Test Water through two points, both using the Test Water 1 and Test Water 3.

FIG. 4 shows the measurement results of the decomposing effect of trichloroethylene in the water to be treated, and FIG. 5 shows the measurement results of the decomposing effect of 1,1,1-trichloroethane in the water to be treated. In FIG. 4, (9) and (10) are the measured values of the Test Water 2 containing only trichloroethylene in the water to be treated. Then, (9) shows the results in a case where hydrogen peroxide was added to only the tank 1, and (10) shows the results in a case where hydrogen peroxide was added to the tank 1 and right before the decomposing unit 7. (11) and (12) show the results of the Test Water 1 which simultaneously contains trichloroethylene and 1,1,1-trichloroethane in the water to be treated. (11) shows the results in a case where hydrogen peroxide was added to only the tank 1, and (12) shows the results in a case where hydrogen peroxide was added to the tank 1 and right before the decomposing unit 7.

FIG. 5 shows the measurement results for Test Water 3. (13) shows the results in a case where hydrogen peroxide was added to only the tank 1, and (14) shows the results in a case where hydrogen peroxide was added to the tank 1 and right before the decomposing unit 7. (15) and (16) are the measured results of the Test Water 1. (15) shows the results in a case where hydrogen peroxide was added to only the tank 1, and (16) shows the results in a case where hydrogen peroxide was added to the tank 1 and right before the decomposing unit 7. The results in a case where the hydrogen peroxide adding amount was 300 mg/l are almost the same as the results in a case where it was 50 mg/l. It is clear that it is more effective to add hydrogen peroxide separately to the initial stage and right before the decomposing unit than adding it only to the initial stage.

Figure 6:
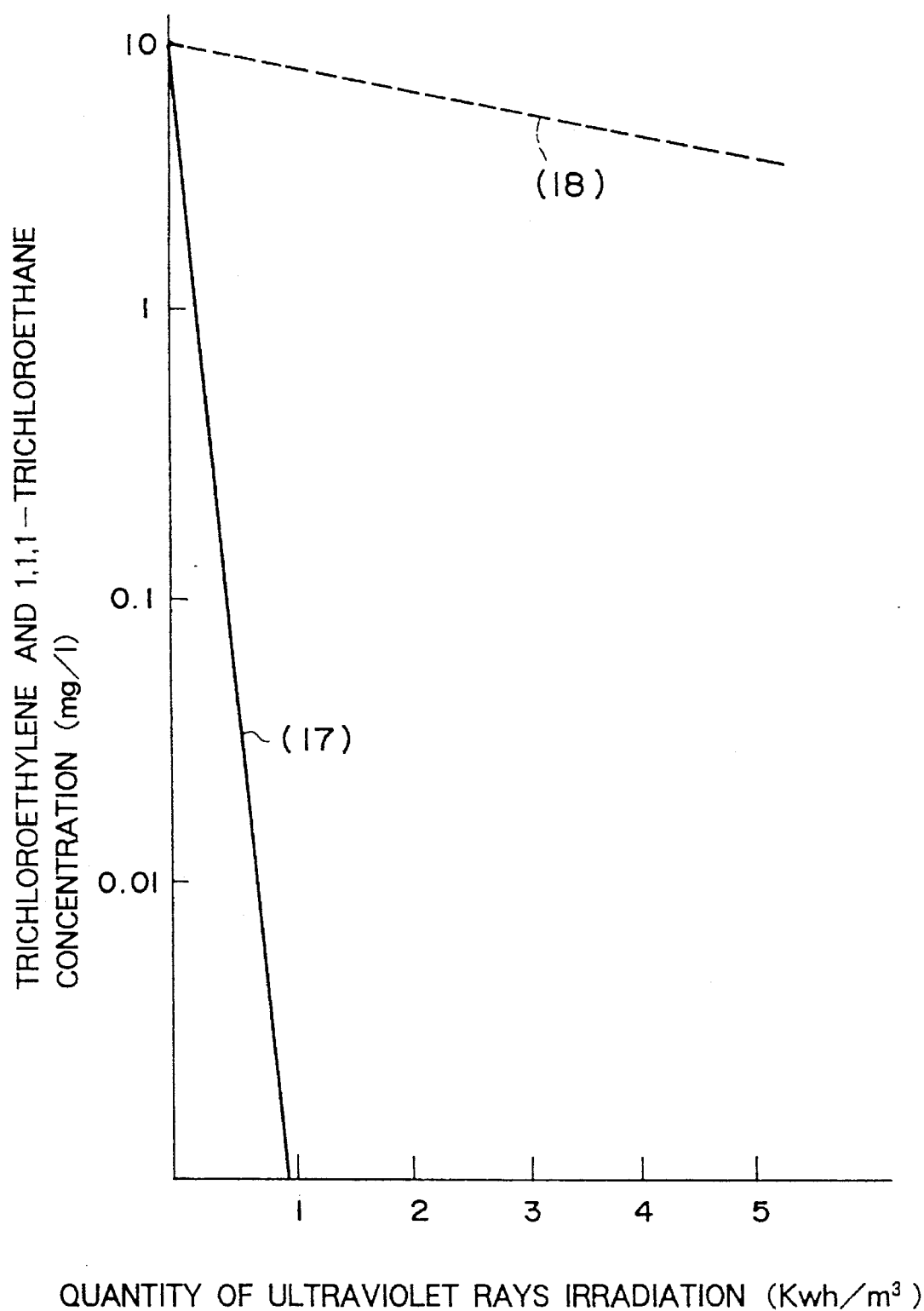
FIG. 6 is a graph for the Test Water 1, showing other comparison of the decomposition effects of trichloroethylene and 1,1,1-trichloroethane when the oxidizing agent is added to the Test Water through one point and two points.

Next, as regards the Test Water 1 which simultaneously contains trichloroethylene at 8 mg/l and 1,1,1-trichloroethane at 8 mg/l, the decomposing experiment was carried out by irradiating ultraviolet rays in such a state that hydrogen peroxide, of which the concentration is 50 mg/l was added to the tank 1 and right before the decomposing unit 7 until the quantity of the ultraviolet irradiation reached 5 kwh per cubic meter. The measured results thereof are shown in FIG. 6. (17) shows the fluctuation of the concentration of trichloroethylene and (18) shows the fluctuation of the concentration of 1,1,1-trichloroethane. When the quantity of ultraviolet irradiation was 5 kwh per cubic meter, the residual concentration of trichloroethylene was less than 0.001 mg/l, which is less than the detectable level.

Figure 9:
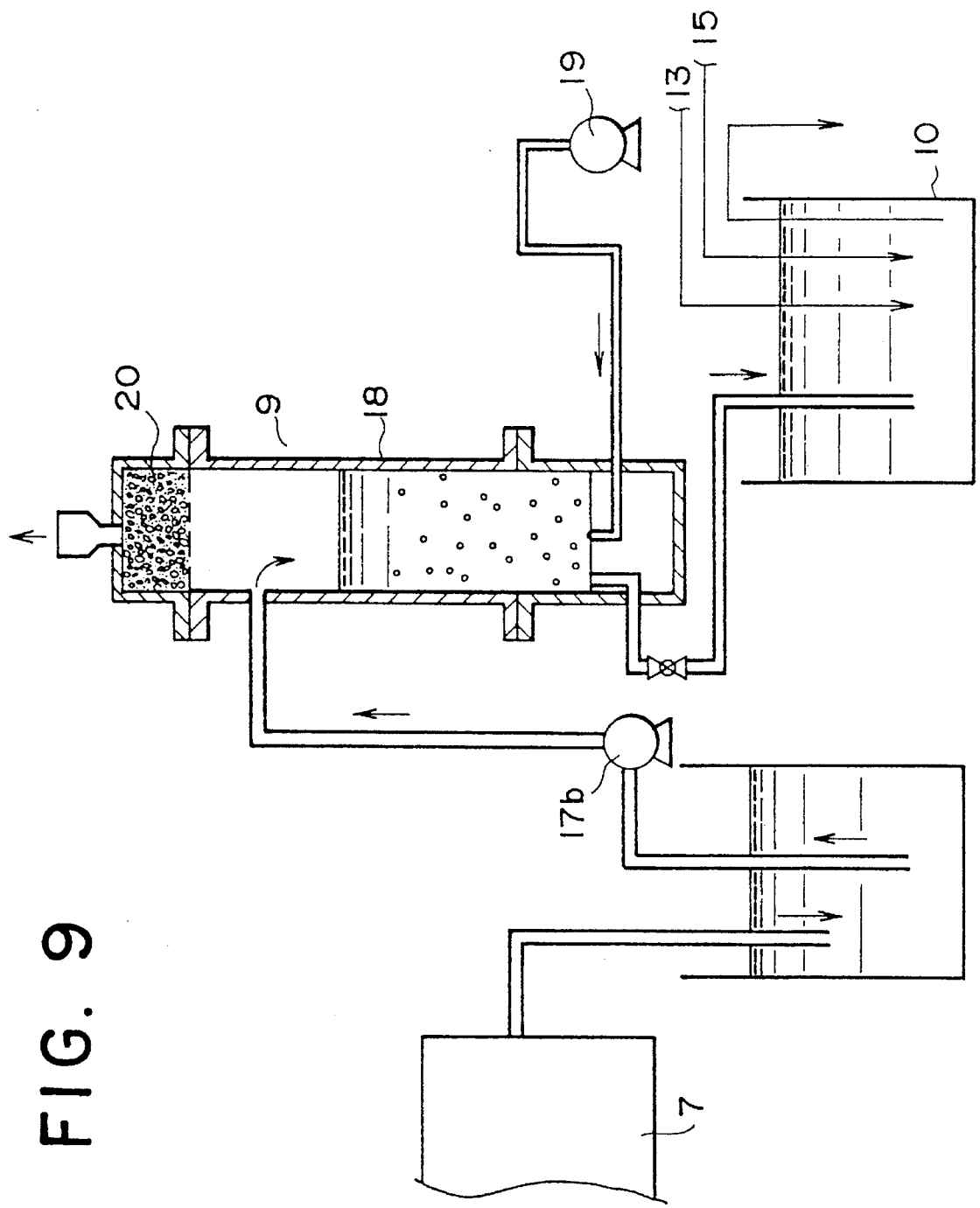
FIG. 9 is a view showing a preferred embodiment of a gas-liquid contact and adsorption unit.

As regards 1,1,1-trichloroethane, the initial concentration thereof was decreased only to 3.1 mg/l. The concentration thereof is not permitted to discharge as it is as usual waste water. Therefore, as shown in FIG. 9, the Test Water was stored in the tank 8 and sent to the gas liquid contact/absorption unit 9. Air was supplied into the tank 8 at an air volume of 100 liters per hour by using an air pump (not illustrated) incorporated in the gas-liquid contact/adsorption unit 9 in order to cause the Test Water 1 to be exposed to air. Then, the concentration of 1,1,1-trichloroethane was measured at five-minute intervals.

Figure 7:
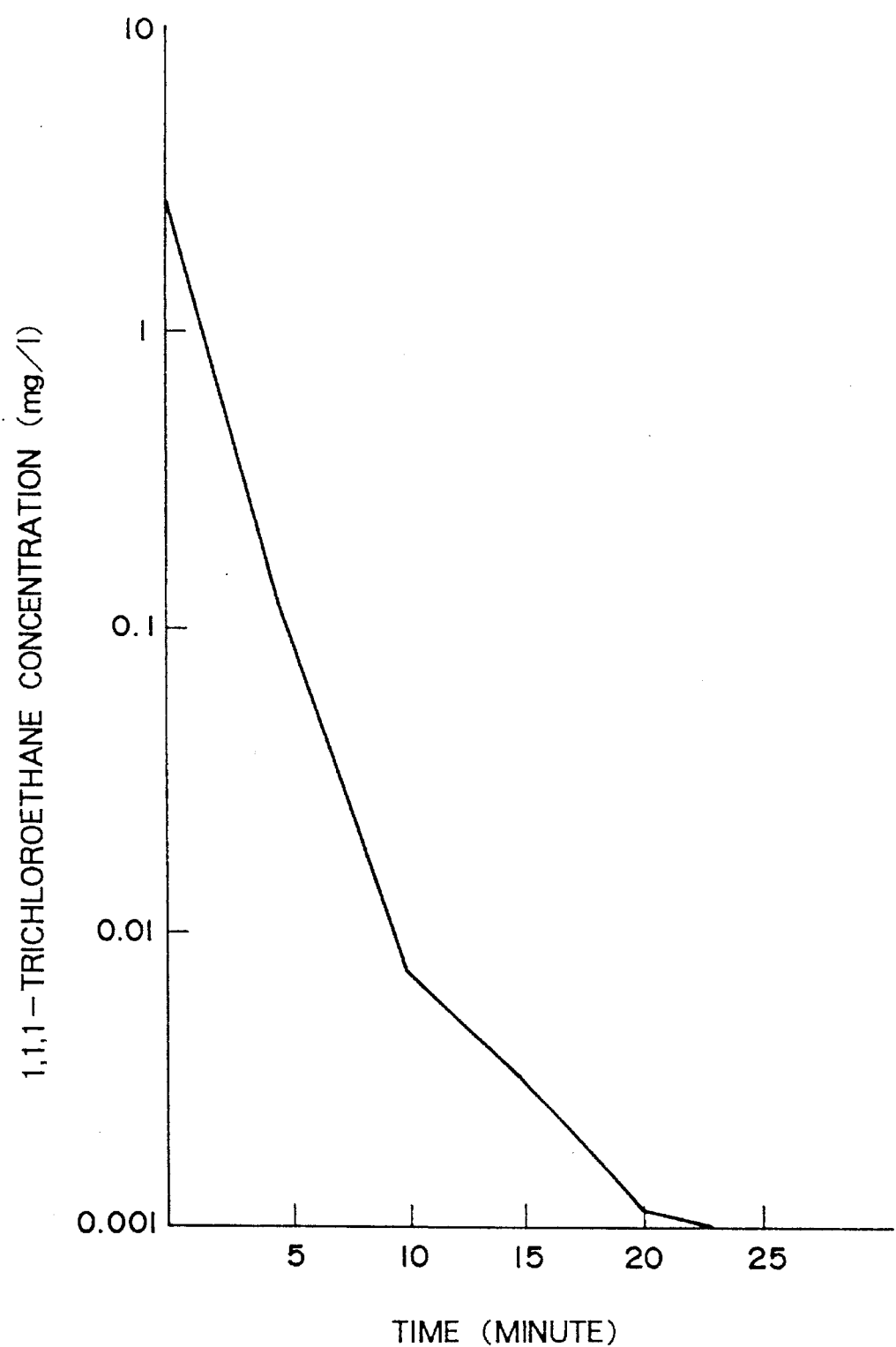
FIG. 7 is a graph showing the effects of removal in the aeration of the Test Water 1 that is the polluted water containing 1,1,1-trichloroethane.

FIG. 7 shows the results thereof. In five minutes, the concentration became 0.1 mg/l, in ten minutes, 0.007 mg/l, in fifteen minutes, 0.003 mg/l, in twenty minutes, 0.0011 mg/l, and in twenty-five minutes, 0.001 mg/l or less, which is less than the detectable level. On the other hand, the water to be treated was sent to the gas-liquid contact/adsorption unit 9 by a pump 17b as shown in FIG. 9. Air is supplied by a pump 19 from the bottom of the air exposing tank 18 to cause the water to be exposed to air in order to cause volatile contents of the water to be brought into air bubbles, and then the air bubbles are adsorbed on an activated carbon 20 above the water surface. 1,1,1-trichloroethane changed from liquid phase to gas phase was adsorbed by the activated carbon.

Figure 8:
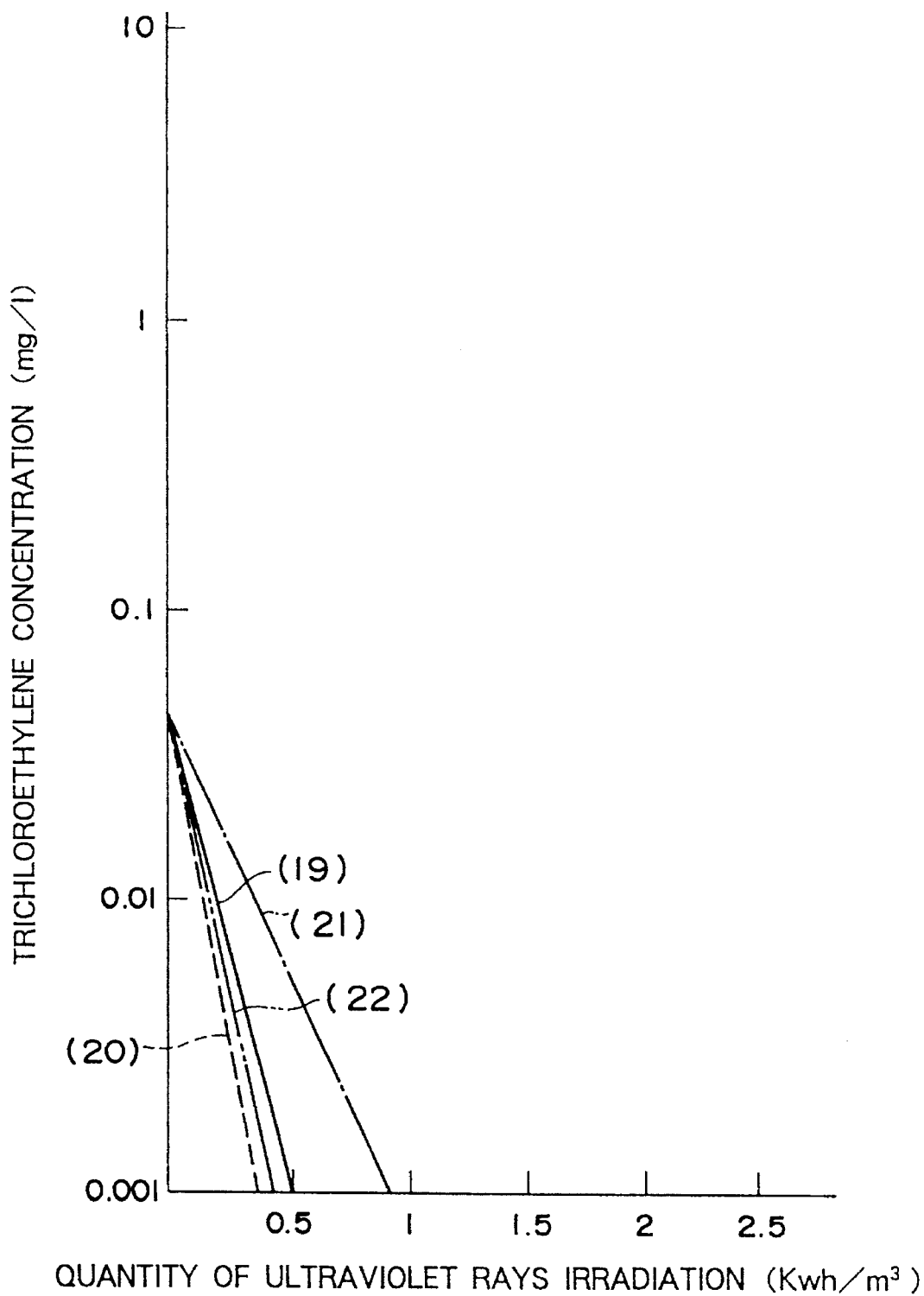
FIG. 8 is a graph showing the comparison of the decomposition effects of trichloroethylene when an oxidizing agent is added to the Test Water through one point and when the oxidizing agent is added to the Test Water through two points, both using the Test Water 1 and Test Water 2.

FIG. 8 shows the results of the decomposing experiments regarding the Test Water 2 containing trichloroethylene at 0.005 ml per liter in the water to be treated, and the Test Water 1 simultaneously containing trichloroethylene of 0.05 mg/l and 1,1,1-trichloroethane of 8 mg/l. The experiments were carried out for both a case where hydrogen peroxide was added to only the tank 1 and a case where it was added to the tank 1 and right before the decomposing unit 7. In FIG. 8, (19) and (20) thereof show the results of the Test Water 2 containing only trichloroethylene of 0.05 mg/l, and (19) shows the results in a case where hydrogen peroxide was added to only the tank 1, and (20) shows the results in a case where hydrogen peroxide was added to the tank 1 and right before the decomposing unit 7. (21) and (22) thereof shows the results of the Test Water 1 simultaneously containing both trichloroethylene of 0.05 mg/l and 1,1,1-trichloroethane of 8 mg/l. (21) shows the results when hydrogen peroxide was added to only the tank 1, and (22) shows the results when hydrogen peroxide was added to the tank 1 and right before the decomposing unit 7. As in FIG. 2, it is understandable that it is more effective to separately add hydrogen peroxide than to add it to only the tank even though the concentration of trichloroethylene is changed.

In the above preferred embodiments, a description was based on the cases where the initial concentration of trichloroethylene is 8 mg/l and 0.05 mg/l with the concentration of trichloroethane of 8 mg/l. However, even in cases where the initial concentration of trichloroethylene is more than 8 mg/l or less than 0.05 mg/l and the concentration of 1,1,1-trichloroethane is a value other than 8 mg/l, it was found that it is remarkably more effective to add hydrogen peroxide separately at two or more times than to add it once at the beginning.

Furthermore, experiments which are similar to those assigned to the cases of trichloroethylene and 1,1,1-trichloroethane were carried out for water containing organic compounds, such as organic chlorine compounds, tetrachloroethylene, dichloroethylene, and dichloroethane in addition to trichloroethylene and 1,1,1-trichloroethane, and furthermore, chloroform, bromodichloromethane, dibromochloromethane, bromoform, etc. as various kinds of trihalomethane. Namely, according to the results for the concentration of 1 to 100 mg/l, in all the cases, although they can be decomposed with ultraviolet rays by adding hydrogen peroxide, the concentration was reduced to 0.001 mg/l by using the gas-liquid contact/adsorption treatment. In FIG. 1, it was more effective to add hydrogen peroxide to both the tank 1 and right before the decomposing unit 7 than to add it to only the tank 1. In a case where substances which need a much greater quantity of ultraviolet rays irradiation for decomposition such as chloroform, bromodichloromethane, etc are contained, the concentration was reduced to 0.001 mg/l in the water by treating them with the gas-liquid contact/adsorption unit 9 after having passed through the decomposing unit 7. Next, the water to be treated, which passed through the gas-liquid contact/adsorption unit 9, was fed to the tank 10 for the residual oxidizing agent removing unit, wherein a pump 14 is operated to supply sodium bisulfide stored in the storage tank 13 to the tank 10 in order to mix with the water to be treated, Thus, the oxidizing agent residual in the water was reduced and then discharged.

In the above, the preferred embodiment copes with an example wherein the oxidizing agents are removed through reduction by using sodiumbisulfide in the tank 13. Activated carbon and/or resin may be alternately used for the same purpose. At the standpoint of handling, activated carbon is more advantageous. Furthermore, sodium hydroxide in a tank 15 is also used for adjusting pH in line with the decomposition of the organic compounds.

Figure 10:
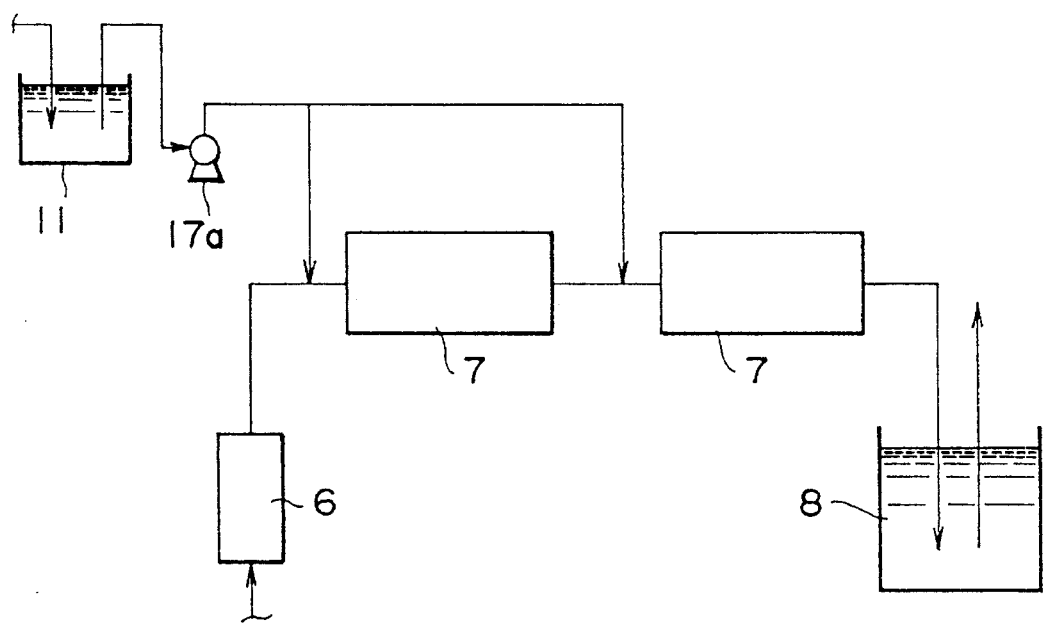
FIG. 10 is a view showing another preferred embodiment of the invention.
Figure 11:
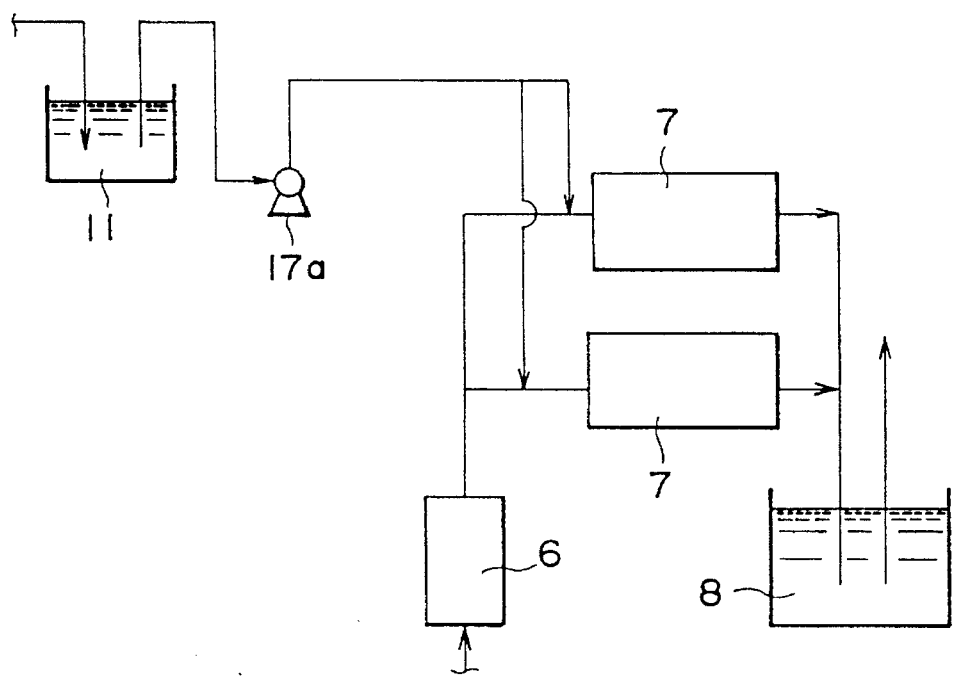
FIG. 11 is a view showing still another preferred embodiment of the invention.

Furthermore, FIG. 1 shows a case where one unit of the decomposing tank 7 is used for decomposing treatment. However, the decomposing unit 7 of more than two stages may be connected and installed in series as shown in FIG. 10, and upgraded treatment may be carried out via the decomposing unit 7 one after another, or individual decomposing treatment may be carried out with the decomposing unit installed parallel to each other as shown in FIG. 11. Furthermore, it is a matter of course that the decomposing unit of more than two units may be connected in series or parallel to each other to allow better decomposing treatment. In either case, it is more advantageous to add the oxidizing agent into piping 26 right before the decomposing unit 7 by the pump 17a in addition to adding the oxidizing agent to the tank 1 by the pump 12.

What is claimed is:

1. A method for treating waste water containing organic compounds, comprising:

adding a first amount of an oxidizing agent into said waste water to disinfect a bacteria contained in said waste water, said first amount being suitable to substantially disinfect the bacteria contained in the waste water and to slightly remain in the waste water, removing a solid material contained in said waste water treated with said oxidizing agent, adding a second amount of said oxidizing agent into said treated waste water, said second amount being selected such that the second amount and a part of the first amount remaining in the waste water are suitable to form hydroxy radicals for sufficiently decomposing the organic compounds in the waste water when ultraviolet rays are irradiated, irradiating the ultraviolet rays onto said treated waste water containing said oxidizing agent to form the active hydroxy radicals so that the organic compounds are decomposed by the hydroxy radicals formed by the part of the first amount and the second amount of the oxidizing agent, exposing forcibly the waste water to air so that volatile organic materials contained in the waste water are retained in the air to adsorb onto an adsorbing material and removing said oxidizing agents remaining in said treated waste water.

2. A method according to claim 1, further comprising adjusting pH of the waste water while or after irradiating ultraviolet rays so that the waste water is properly processed.

3. A method according to claim 2, wherein said oxidizing agents are removed by at least one of reducing agent, activated carbon and catalyst.

4. A method according to claim 1, wherein said organic compounds are organic chlorine compounds.

5. A method according to claim 1, wherein said oxidizing agent is hydrogen peroxide or ozone.

6. A method according to claim 5, wherein said organic compounds include 1,1,1-trichloroethane.

* * * * *